(12) United States Patent
Jadhav et al.

(10) Patent No.: US 7,572,318 B2
(45) Date of Patent: Aug. 11, 2009

(54) HIGH-TEMPERATURE MEMBRANE FOR $CO_2$ AND/OR $H_2S$ SEPARATION

(75) Inventors: Raja A. Jadhav, Naperville, IL (US); Shain J. Doong, Kilden, IL (US)

(73) Assignee: Gas Technology Institute, Des Plaines, IL (US)

( * ) Notice: Subject to any disclaimer, the term of this patent is extended or adjusted under 35 U.S.C. 154(b) by 542 days.

(21) Appl. No.: 11/406,695

(22) Filed: Apr. 18, 2006

(65) Prior Publication Data

US 2007/0240570 A1 Oct. 18, 2007

(51) Int. Cl.
*B01D 53/22* (2006.01)
*B01D 71/02* (2006.01)

(52) U.S. Cl. .......................... 95/45; 95/49; 95/51; 96/4; 96/8; 96/10; 96/11; 55/523; 55/524; 210/640

(58) Field of Classification Search .................. 96/4, 96/8, 9, 10, 11, 12; 95/45, 49, 51, 54; 55/523, 55/524; 210/640, 641, 650
See application file for complete search history.

(56) References Cited

U.S. PATENT DOCUMENTS

| | | | | |
|---|---|---|---|---|
| 5,131,928 A | * | 7/1992 | Blackman et al. | 210/638 |
| 5,306,476 A | * | 4/1994 | Jalan et al. | 96/11 |
| 5,332,597 A | * | 7/1994 | Carolan et al. | 427/243 |
| 5,681,373 A | * | 10/1997 | Taylor et al. | 96/11 |
| 5,885,454 A | * | 3/1999 | Yagihashi et al. | 96/11 |
| 5,980,989 A | * | 11/1999 | Takahashi et al. | 96/11 |
| 6,074,457 A | * | 6/2000 | Anthonis et al. | 96/11 |
| 6,492,290 B1 | * | 12/2002 | Dyer et al. | 96/11 |
| 6,508,860 B1 | * | 1/2003 | Kulkarni et al. | 95/51 |
| 6,626,980 B2 | * | 9/2003 | Hasse et al. | 95/51 |
| 6,726,744 B2 | * | 4/2004 | Kulprathipanja et al. | 95/51 |
| 6,793,711 B1 | * | 9/2004 | Sammells | 210/500.25 |
| 7,264,650 B2 | * | 9/2007 | Lou et al. | 96/11 |
| 7,344,585 B1 | * | 3/2008 | Kulprathipanja et al. | 95/45 |

FOREIGN PATENT DOCUMENTS

JP 2001-300274 * 10/2001

OTHER PUBLICATIONS

Liu, Paul T. K., "$CO_2$ Selective Ceramic Membrane for Water-Gas-Shift Reaction with Concomitant Recovery of $CO_2$", Final Report, U.S. Department of Energy, Jul. 15, 2005, pp. 44-83.
Chauk, Shriniwas, S. et al., "Kinetics of High-Pressure Removal of Hydrogen Sulfide Using Calcium Oxide Powder", AIChE Journal, vol. 46, No. 6, Jun. 2000, pp. 1157-1167.

(Continued)

*Primary Examiner*—Jason M Greene
(74) *Attorney, Agent, or Firm*—Mark E. Fejer

(57) ABSTRACT

A nonporous metal carbonate membrane for selective separation of $CO_2$ from a $CO_2$-containing fluid having a porous substrate having a feed side and a permeate side. The membrane is also suitable for removal of $H_2S$ that may be present in the fluid.

28 Claims, 3 Drawing Sheets

OTHER PUBLICATIONS

Bhatia, S. K. et al., "Effect of the Product Layer on the Kinetics of the $CO_2$-Lime Reaction," *AIChE Journal*, vol. 29, No. 1, Jan. 1983, pp. 79-86.

Mess, Derek et al., "Product Layer Diffusion during the Reaction of Calcium Oxide with Carbon Dioxide," *Energy & Fuels*, 1999, 13, 999-1005.

Lin, Jerry Y. S., "Novel Inorganic Membranes for High Temperature Carbon Dioxide Separation", Final Technical Report, U.S. Department of Energy (Contract No. DE-FG26-00NT40824), Feb. 2003.

Nair, Balagopal N. et al., "Development of Lithium Zirconate Based Ceramic Materials and Membranes for High Temperature $CO_2$ Separation", Dept. of Chemical System Engineering, University of Japan, Tokyo (no date).

Kumakiri, Izumi et al., "Lithium Oxide Membranes for High Temperature CO2 Separation", (Abstract), Eighth International Conference on Inorganic Membranes, Jul. 2004.

Nair, B. N. et al., "Development of a Novel Membrane System Based on $Li_2ZrO_3$ for High Temperature $CO_2$ Separation", ICOM 2002, Jul. 2002, Book of Abstracts, p. 87.

Nair, B. N., et al., "Development of a Novel Membrane System for High Temperature $CO_2$ Separation", 34th Meeting of Chemical Eng. Society of Japan, Sep. 2001, Proceedings, p. 885.

Lin, Jerry Y. S. et al., "Dual Phase Membrane for High Temperature $CO_2$ Separation", Technical Progress Report, U.S. Dept. of Energy, (Contract No. DE-FG26-00NT41555) Mar. 2005.

* cited by examiner

HIGH-TEMPERATURE MEMBRANE FOR $CO_2$ AND/OR $H_2S$ SEPARATION

BACKGROUND OF THE INVENTION

1. Field of the Invention

This invention relates to a method and apparatus for separation of $CO_2$ and $H_2S$ from fluid mixtures containing the $CO_2$ and $H_2S$, such as synthesis gas produced by the gasification of carbonaceous materials and product gases derived from fuel reforming processes. More particularly, this invention relates to $CO_2$— and $H_2S$-selective membranes for high-temperature $CO_2$ and/or $H_2S$ separation applications.

2. Description of Related Art

Considering the importance of fossil fuels to the U.S. economy and the impact of anthropogenic $CO_2$ emissions on global warming, developing an effective approach to carbon sequestration, which requires capturing and securely storing $CO_2$ emitted from the combustion of fossil fuels is a matter of great urgency. The overall carbon sequestration scheme comprises two basic elements—(1) separation and capture, including compression, of $CO_2$ from power plants and other emitters and (2) transportation and disposal of the captured $CO_2$ in suitable geological formations or oceans. It is estimated that the costs of $CO_2$ capture and storage would be about $40-$60 per ton of $CO_2$ emissions avoided. Up to 75% of these costs may be associated with the capture and sequestration of $CO_2$ from combustion product gases (i.e. flue gases).

Current options under consideration for separation and capture of $CO_2$ include scrubbing with suitable solvents (either physical or chemical), regenerable sorbents, membranes, cryogenic separation, and pressure and temperature swing adsorption. Of these technologies, solvent-based scrubbing is at present the most mature $CO_2$ separation technology. However, it is not considered to be cost-effective and it is not suitable for use in large-scale power plants. The other technologies are not yet mature or cannot be applied economically at the scale required for power plants.

Various types of $CO_2$-selective membranes are under development, particularly for separating $CO_2$ from fuel/flue gas, with the ultimate objective being sequestration. A major portion of the current work is focused on microporous (pore size less than 2 nm) inorganic membranes based on alumina, zirconia or zeolite membranes supported on porous materials. However, because the separation is based on differences in the physical size, diffusivity and chemical properties of the molecules, separation factors (defined as the ratio of the permeation rate of $CO_2$ to that of the other molecules) are usually low and other molecules, for example hydrogen, permeate along with the $CO_2$. Perovskite oxide-type membranes, such as $BaTiO_3$, have also been studied for $CO_2$ separation because of their excellent stability at high temperatures. However, lower values of $CO_2/N_2$ separation factors (1.1-1.2) cast doubt on the potential of the ceramic membranes.

To increase the $CO_2$ separation factor, dense membranes based on ceramic materials have been studied in recent years. In one recent project sponsored by the U.S. Department of Energy, hydrotalcite compounds (HTCs) based on Mg—Al—O oxides (for example, $Mg_{0.16}Al_{0.24}(OH)_2(CO_3)_{0.12}0.43H_2O$) prepared by sol-gel and precipitation methods have been studied as potential $CO_2$ removal membranes in the medium temperature range of about 200-300° C. These mixed-oxide ceramic membranes take advantage of the chemical interaction between acidic $CO_2$ and basic oxides in the HTCs. Activation energy calculations suggest the activated diffusion of $CO_2$ through the intercrystalline region of the HTC. However, the chemical interaction may make the reaction irreversible and would result in lower permeation rates. Dense and dual-phase membranes based on $K_2CO_3$-doped $Li_2ZrO_3$ have also been studied for high-temperature (500° C.) $CO_2$ separation. Based on the carbonate ion conductivity data, $CO_2$ permeance of about $1\times10^{-7}$ mol/m$^2$·s·Pa has been calculated at about 500-600° C.

SUMMARY OF THE INVENTION

It is one object of this invention to provide a method and apparatus for selective removal of $CO_2$ from $CO_2$-containing fluids, typically gaseous mixtures, at high temperatures, that is, temperatures equal to or greater than about 200° C.

It is another object of this invention to provide a method and apparatus for selective removal of $CO_2$ from $CO_2$-containing fluids which overcomes some of the disadvantages of known $CO_2$ removal techniques discussed herein above.

It is yet another object of this invention to provide a method and apparatus for selective removal of $H_2S$ from $H_2S$-containing fluids.

These and other objects of this invention are addressed by a method and apparatus for selective separation of $CO_2$ and/or $H_2S$ from other fluid components at high temperatures using a nonporous membrane comprising at least one dense metal carbonate. More particularly, the method and apparatus of this invention employ a nonporous metal carbonate membrane having a feed side and a permeate side for selective separation of $CO_2$ from $CO_2$-containing gaseous mixtures and $H_2S$ from $H_2S$-containing gaseous mixtures. The at least one dense metal carbonate comprises a metal selected from the group consisting of Ca, Mg, Ba, Sr, Cd, Mn, Fe, Zn, Co, Ni, and combinations thereof. In accordance with one preferred embodiment of this invention, the metal carbonate membrane is deposited on the feed side of a porous substrate. Alternatively, the metal carbonate membrane may be deposited on the permeate side of the porous substrate or in the interior of the porous substrate. In accordance with one particularly preferred embodiment of this invention, the at least one dense metal carbonate is selected from the group consisting of $CaCO_3$, $MgCO_3$, $Ca-Mg(CO_3)_2$ and combinations thereof.

The concept of this invention is based upon the fact that the dense carbonate membranes allow only $CO_2$ in the form of carbonate ions and/or $H_2S$ in the form of sulfide ions to diffuse through and exclude all other gas species present in the gaseous mixture, including hydrogen. Thus, the method of this invention can achieve 100% selectivity for $CO_2$ and/or $H_2S$ on the permeate side of the membranes. The membranes can operate at higher temperatures (greater than 200° C.) than conventional membranes to enable higher diffusion flux for the carbonate ($CO_3^{2-}$) ions. The high-temperature membranes of this invention are suitable for use in applications for $CO_2$ separation from fuel/flue gas or synthesis gas without the need of gas cooling. They can be used as a membrane reactor with the water gas shift reaction to increase hydrogen production by removing the equilibrium limitation. The catalysts of the water gas shift reaction may be eliminated if the membrane reactor is operated at sufficiently high temperatures (greater than about 500° C.). More importantly, hydrogen is produced at the feed pressure of the synthesis gas as opposed to the low pressure hydrogen generated from other hydrogen-selective membranes.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

As used herein, the term "nonporous" when applied to a structure, such as a membrane or membrane substrate interface, is intended to mean a structure having no pores. It will, however, be appreciated that methods for creating a structure having no pores may, nevertheless, result in a structure having a nominal amount of pores. So long as such pores do not permit the passage of more than a nominal amount of other components of a fluid mixture comprising $CO_2$ and/or $H_2S$, structures indicated herein to be nonporous and having such nominal amount of pores are deemed to be within the scope of this invention.

Figure 1:
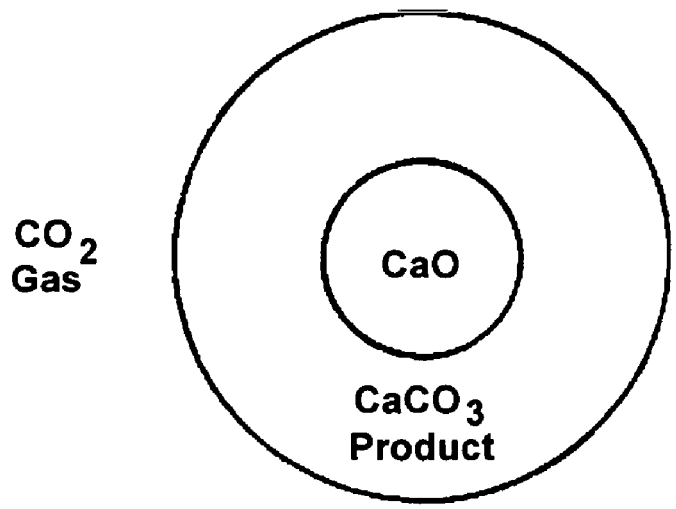
FIG. 1 is a simplified schematic diagram representing the formation of a nonporous calcium carbonate ($CaCO_3$) product layer surrounding an unreacted CaO particle.

The reaction between MeO particles and $CO_2$ can be expressed as follows:

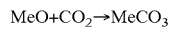

$$MeO + CO_2 \rightarrow MeCO_3 \quad (1)$$

where Me is a metal selected from the group consisting of Ca, Mg, Ba, Sr, Cd, Mn, Fe, Zn, Co, Ni, and combinations thereof. Gas-solid reactions are characterized by an initial fast kinetic-controlled reaction followed by a much slower diffusion-controlled reaction. During the first stage of the reaction, $CO_2$ reacts on the surface of MeO particles and forms a nonporous product layer of $MeCO_3$ surrounding an unreacted MeO particle as shown for $CaCO_3$ and CaO in FIG. 1. This fast reaction stage is followed by a much slower ionic diffusion of $CO_2$ in the form of $CO_3^{2-}$ ions through the nonporous carbonate layer.

Without intending to be bound by any particular explanation as to the mechanism by which the method of this invention operates, two different temperature-dependent mechanisms have been proposed for describing the migration of carbonate ions through the carbonate product layer to reach the surface of the unreacted metal oxide. Thus, for the example of CaO, at temperatures lower than 500° C., it is thought that carbonate ions diffuse through the $CaCO_3$ product layer accompanied by countercurrent diffusion of $O^{2-}$ ions to maintain the electric neutrality in the $CaCO_3$ product layer. At temperatures higher than 500° C., it is thought that sequential decomposition of carbonate ions in the $CaCO_3$ layer provides the pathway for the carbonate ion diffusion. Under this scenario, the composition of carbonate ions produces $CO_2$ and an $O^{2-}$ ion. The $CO_2$ molecule then moves to a neighboring site vacated by a similar phenomenon while another $CO_2$ molecule produced elsewhere by a similar way moves to take its place and reform the carbonate ion. The $CO_2$ molecule thus diffuses site to site through the product layer towards the CaO—$CaCO_3$ interface where it ultimately reacts according to the above reaction 1.

The invention claimed herein is a system for separating $CO_2$ and/or $H_2S$ from a $CO_2$— and/or $H_2S$-containing fluid, such as a synthesis gas or reformed fuel. The system comprises a nonporous (dense) metal carbonate membrane having a feed side and a permeate side. This membrane is able to achieve very high $CO_2$ and $H_2S$ separation factors with no diffusion of other major gaseous components, such as CO and $H_2$.

Figure 2:
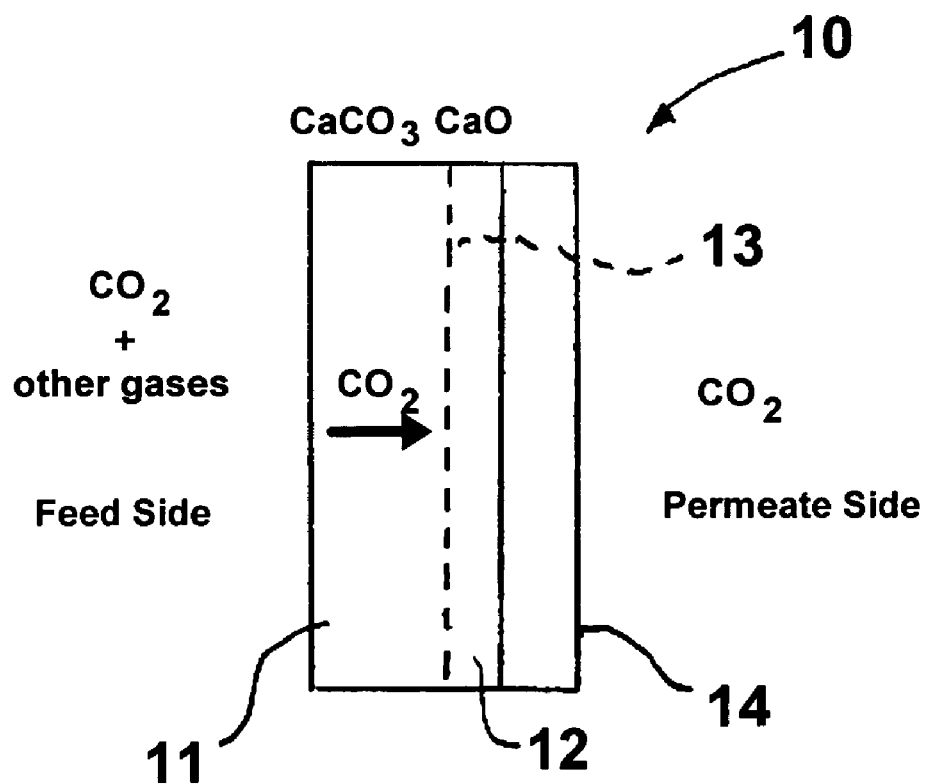
FIG. 2 is a schematic diagram showing operation of the membrane in accordance with one embodiment of this invention.

A schematic diagram of a composite membrane 10 in accordance with one embodiment of this invention is shown in FIG. 2. In operation, in accordance with one embodiment of this invention, an ultra-thin membrane 11 of nonporous $CaCO_3$ is exposed to a gaseous mixture comprising $CO_2$ on the feed side of the membrane. The partial pressure of $CO_2$ on the feed side is always maintained above the equilibrium value corresponding to the $CaCO_3$ decomposition so that $CaCO_3$ does not decompose into CaO on the feed side of the membrane. However, on the permeate side, because the $CO_2$ partial pressure is much lower than the equilibrium pressure, $CaCO_3$ decomposes into porous CaO 12. Thus, an arbitrary interface 13 between $CaCO_3$ and CaO may be visualized as shown in FIG. 2. On the $CaCO_3$ (feed) side of the membrane, $CO_2$ is believed to diffuse according to the second mechanism described herein above, whereas, on the CaO (permeate) side of the membrane, diffusion of the $CO_2$ gas is believed to take place by conventional molecular diffusion.

In accordance with another embodiment of this invention, the ultra-thin membrane is a metal oxide (MeO) which, upon contact with $CO_2$, is converted to $MeCO_3$.

In addition to $CO_2$, the $CaCO_3$ nonporous membrane in accordance with one embodiment of this invention has the potential to extract hydrogen sulfide ($H_2S$) from other gases. The reversible reaction of $H_2S$ with $CaCO_3$ can be represented as:

$$CaCO_3 + H_2S \rightarrow CaS + CO_2 + H_2O \quad (2)$$

An ionic mechanism for the diffusion of sulfide ($S^{2-}$) ions through the CaS product layer for reaction (2) is proposed based upon Pt-marker studies which suggest countercurrent diffusion of $S^{2-}$ and $O^{2-}$ ions through the CaS product layer. On the permeate side, $H_2O$ in the form of steam could be provided so that the reverse of reaction (2) takes place to form $H_2S$ molecules at the CaS/CaO interface similar to the $CaCO_3$/CaO interface shown in FIG. 2, which will be swept away by the steam. For gaseous mixtures containing both $CO_2$ and $H_2S$, the method and apparatus of this invention provide for removal of the $H_2S$ from the mixture prior to removal of the $CO_2$ using the CaS/CaO membrane.

Diffusion of ions through solids is an activated process and can be expressed by the Arrhenius-type equation. For diffusion of $CO_3^{2-}$ ions through the $CaCO_3$ product layer, experimental results indicate an activation energy of 42.7 kcal/mole whereas for diffusion of $S^{2-}$ ions through the product layer, the estimated value of the activation energy is 38.4 kcal/mole. Such a higher value of activation energy dramatically increases the diffusivity of ions at higher temperatures, which results in higher permeation rates for the gas components.

Nanocrystalline particles are known to possess surface reactivity that is significantly higher than the typical bulk products. The enhanced surface reactivity is believed to be due to the higher population of reaction sites at the edges and corners of the small crystallites. Thus, the nanoparticles may possess higher ionic diffusivity values. In addition, the actual diffusion of $CO_3^{2-}$ ions may occur across a very small membrane thickness that would increase the overall diffusion flux.

The $CaCO_3$ membrane in accordance with one embodiment of this invention is supported on a porous support 14, for example, alumina. Other materials suitable for use as a porous substrate include silica, zirconia, alumina-silicates, zeolites, stainless steel, ceramics and combinations thereof. The $CaCO_3$ particles may be deposited on the feed side surface of the porous substrate, filling the superficial pores of the porous substrate with $CaCO_3$. Such depositing of the $CaCO_3$ particles on the porous substrate may be achieved in accordance with one embodiment of this invention by precipitation of the $CaCO_3$ from an aqueous solution comprising calcium and carbonate ions. Preferably, the reaction and particles growth conditions are controlled such that each of the superficial pores of the support is filled with a single crystal of $CaCO_3$. Such a procedure produces a membrane module having an ultra-thin $CaCO_3$ membrane layer, which reduces the overall length of the diffusion path for the $CO_2$. Accordingly, in accordance with one preferred embodiment of this invention, the superficial pores on the feed side surface of the porous substrate have pore sizes of less than or equal to about 200 nm, preferably less than or equal to about 20 nm, and the $CaCO_3$ particles are sized to fit within the superficial pores. In accordance with one preferred embodiment of this invention, the particle sizes of the $CaCO_3$ particles are less than about 20 nm.

Figure 3:
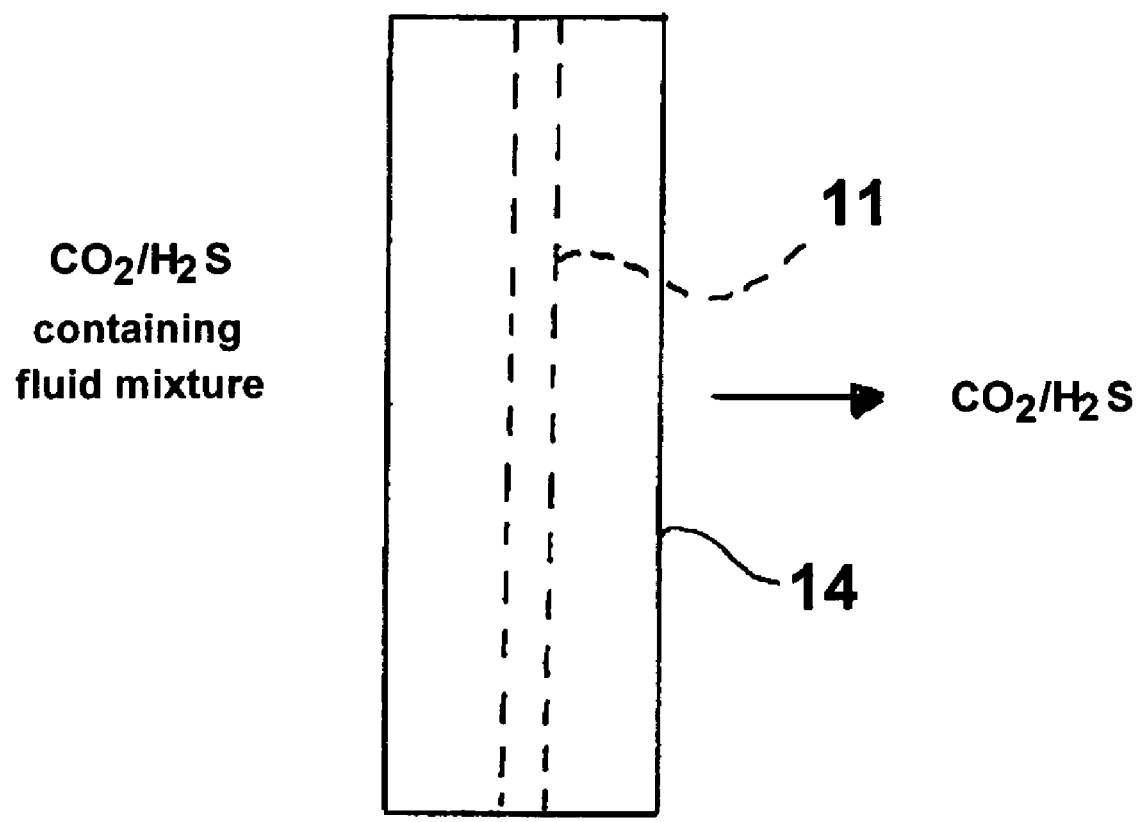
FIG. 3 is a diagram showing a nonporous membrane disposed within the interior of a porous substrate in accordance with one embodiment of this invention.

Other methods for creating the membranes of this invention include in-situ crystallization of $CaCO_3$ nano particles, in which aqueous solutions containing $Ca^{2+}$ and $CO_3^{2-}$ ions are introduced on two sides of the membrane support to form a nonporous membrane of $CaCO_3$ crystals within the interior of the porous substrate as shown in FIG. 3; infiltration of CaO nano particles from solution into the pores of a porous support so that the CaO particles block the support pores; deposition of a thin layer of Ca on the surface or within the pores of a support structure by methods such as vapor phase deposition; and pressing CaO particles into a flat structure, such as a disc, followed by sintering of the disc to form a nonporous CaO membrane disc.

Figure 4:
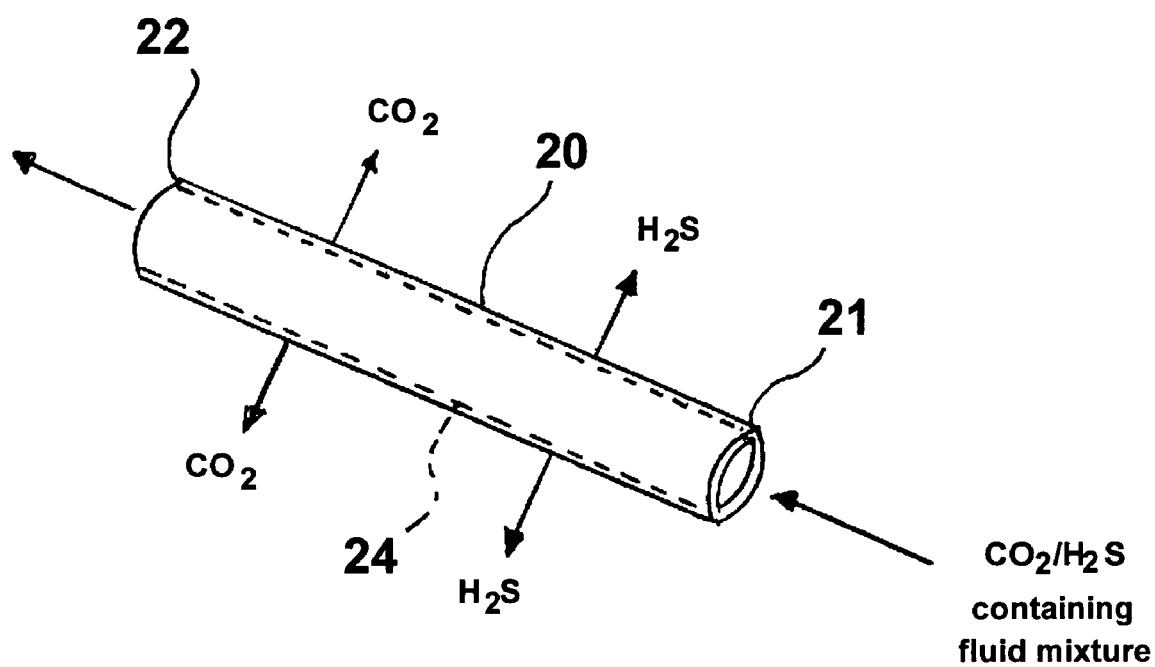
FIG. 4 is a diagram showing a tubular porous substrate with a nonporous membrane disposed on an interior surface of the tube in accordance with one embodiment of this invention.

In accordance with one embodiment of this invention, the nonporous membrane has a tubular shape. This embodiment is particularly advantageous as it enables the sequential removal of $H_2S$ and $CO_2$ in a single step. As shown in FIG. 4, in accordance with one embodiment of this invention, the porous substrate is in the form of a tube 20 having a fluid inlet end 21 and a fluid outlet end 22 wherein the tubular shaped nonporous membrane 24 is disposed on either the inside surface (as shown) or the outside surface of the substrate or within the pores of the substrate. In operation, a fluid mixture containing both $CO_2$ and $H_2S$ is introduced into the inlet end 21 of tube 20. As the fluid mixture contacts a first portion of the nonporous membrane proximate inlet end 21, $H_2S$ in the mixture passes through the membrane to the outside of the tube. As the mixture continues to flow through the tube, with the $H_2S$ having already been separated from the mixture, $CO_2$ in the mixture passes through a second portion of the nonporous membrane disposed downstream of the first portion of the nonporous membrane. It will be appreciated by those skilled in the art that other arrangements of membranes which enable the sequential removal of $H_2S$ and $CO_2$ are also possible, and such arrangements are deemed to be within the scope of this invention.

EXAMPLE

In this example, a nonporous $CaCO_3$ membrane was produced using $CaCl_2 \cdot 2H_2O$ powder obtained from Alfa-Aesar, Ward Hill, Mass., $Na_2CO_3$ powder obtained from Aldrich Chemical Company, Milwaukee, Wis., and a porous alfa-alumina support tube having a nominal pore size of 50 nm, an inside diameter of 3.5 mm, an outside diameter of 5.5 mm and a length of 2 inches obtained from Media and Process Technology, Inc., Pittsburgh, Pa. The support tube was closed at one end using a silicone stopper and filled with 0.5M $CaCl_2$ solution. The filled tube was immediately dipped into another solution containing 0.5M $Na_2CO_3$. Care was taken to avoid mixing of the two solutions except at an interface within the support tube wall, where calcium and carbonate ions react to form $CaCO_3$ crystals. After 24 hours, the tube was removed, the excess solution shaken off, and dried in an oven at 110° C. for 2 hours. Based upon the initial and final weight of the tube, it was determined that about 10 mg of $CaCO_3$ was deposited within the pores of the tube.

Leak testing of the membrane was performed by contacting the feed side of the membrane with helium at 25° C. and a pressure of about 5 psig and contacting the permeate side with nitrogen at about 1 psig. Analysis by gas chromatograph of the permeate stream showed no presence of helium, indicating a nonporous or leak-free membrane under the test conditions.

Operating conditions under which the nonporous membranes of this invention may be used for separation of $CO_2$ and $H_2S$ are subject to considerable variation. In accordance with one embodiment of this invention, the preferred operating temperature is in the range of about 700° C. to about 1000° C. However, the exact temperature is determined by the supplied partial pressure of $CO_2$ on the feed side of the membrane and the required partial pressure of $CO_2$ on the permeate side as determined by the thermodynamics of the reversible gas-solid reaction.

As previously indicated, during the process of separation of $CO_2$ from a fluid mixture, the $MeCO_3$ membrane transitions to a membrane having a $MeCO_3$/MeO interface. The smallest thickness of the $MeCO_3$ side of the membrane is obtained when the temperature of the process is maintained just below the equilibrium calcination temperature corresponding to the $CO_2$ partial pressure on the feed side of the membrane. When operating at and above the equilibrium calcination temperature, the $MeCO_3$ portion of the membrane will cease to exist, leaving a membrane entirely of MeO.

In addition to the benefit derived from $CO_2$ separation, removal of $CO_2$ at high temperatures using a $CO_2$-selective membrane in accordance with this invention also increases the concentration of $H_2$ in the synthesis gas stream, which may either be used for chemicals production, fuel cells, or for Fisher-Tropsch liquids production. The composition of the synthesis gas is essentially determined by the equilibrium-limited water-gas-shift (WGS) reaction. If the $CO_2$ is removed at high temperatures, the equilibrium of the reaction will shift towards the right and additional CO will be available for generation of $H_2$. At temperatures greater than about 500° C., the kinetics of the WGS reaction are very fast. Thus, removal of $CO_2$ at high temperatures eliminates the low-temperature catalytic WGS reactor that is generally employed for the production of $H_2$.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A system for selective separation of at least one of $CO_2$ and $H_2S$ from a fluid mixture comprising said at least one of said $CO_2$ and said $H_2S$ comprising:
    a nonporous membrane having a feed side and a permeate side and formed by a material selected from the group consisting essentially of metal carbonates or metal carbonates and metal oxides.

2. A system in accordance with claim 1, wherein said metal carbonate membrane comprises a metal selected from the group consisting of Ca, Mg, Ba, Sr, Cd, Mn, Fe, Zn, Co, Ni, and combinations thereof.

3. A system in accordance with claim 1, wherein at least a portion of said permeate side of said nonporous metal carbonate membrane comprises at least one said metal oxide.

4. A system in accordance with claim 3, wherein said at least one metal oxide comprises a metal selected from the group consisting of Ca, Mg, Ba, Sr, Cd, Mn, Fe, Zn, Co, Ni, and combinations thereof.

5. A system in accordance with claim 1, wherein said nonporous membrane is one of disposed on a surface of a porous substrate and disposed within an interior of said porous substrate.

6. A system in accordance with claim 5, wherein substantially all pores of said porous substrate have pore sizes one of less than and equal to about 1000 nm in diameter.

7. A system in accordance with claim 6, wherein said pore sizes are one of less than and equal to about 200 nm in diameter.

8. A system in accordance with claim 7, wherein said pore sizes are one of less than and equal to about 20 nm in diameter.

9. A system in accordance with claim 6, wherein said nonporous membrane comprises a plurality of nano particles, substantially all of which are sized to fit within said pores of said porous substrate.

10. A system in accordance with claim 1, wherein said nonporous membrane has a tubular shape.

11. A system in accordance with claim 5, wherein said porous substrate has a tubular shape.

12. A method for separation of at least one of $CO_2$ and $H_2S$ from a fluid mixture comprising at least one of said $CO_2$ and said $H_2S$, the method comprising:
    contacting a feed side of a nonporous membrane formed by a material selected from the group consisting essentially of metal carbonates, or metal carbonates and metal oxides with said fluid mixture;
    selectively passing one of said $CO_2$ and said $H_2S$ through said nonporous membrane to a permeate side of said membrane without passing any other components of said fluid mixture through said nonporous membrane; and
    accumulating said one of said $CO_2$ and said $H_2S$ on said permeate side of said nonporous membrane.

13. A method in accordance with claim 12, wherein said $H_2S$ is preferentially passed through said nonporous membrane before said $CO_2$.

14. A method in accordance with claim 12, wherein said nonporous membrane comprises a layer of said metal carbonate.

15. A method in accordance with claim 13, wherein said nonporous membrane comprises a metal oxide portion disposed on said permeate side of said membrane.

16. A method in accordance with claim 12, wherein said nonporous membrane is disposed on a surface of a porous substrate.

17. A method in accordance with claim 12, wherein said nonporous membrane is formed within an interior of said porous substrate.

18. A method in accordance with claim 12, wherein said nonporous membrane is in a form of a tube having an inlet end and an outlet end.

19. A method in accordance with claim 18, wherein said fluid mixture is introduced into said inlet end of said tube and said $H_2S$ is removed through a first portion of said nonporous membrane proximate said inlet end.

20. A method in accordance with claim 19, wherein said $CO_2$ is removed through a second portion of said nonporous membrane downstream of said first portion of said nonporous membrane.

21. A method in accordance with claim 12, wherein said fluid mixture is a synthesis gas produced by a carbonaceous material gasification process.

22. A method in accordance with claim 12, wherein at least one of said metal carbonate and said metal oxide comprises a metal selected from the group consisting of Ca, Mg, Ba, Sr, Cd, Mn, Fe, Zn, Co, Ni, and combinations thereof.

23. A composite membrane for selective separation of at least one of $CO_2$ and $H_2S$ from a fluid mixture comprising said at least one of said $CO_2$ and said $H_2S$, said composite membrane comprising:
    a porous substrate having a feed side and a permeate side; and
    a material selected from the group consisting essentially of metal carbonates, or metal carbonates and metal oxides disposed one of on a surface of said porous substrate or within an interior of said porous substrate, thereby rendering said composite membrane nonporous.

24. A composite membrane in accordance with claim 23, wherein at least one of said metal carbonate and said metal oxide comprises a metal selected from the group consisting of Ca, Mg, Ba, Sr, Cd, Mn, Fe, Zn, Co, Ni, and combinations thereof.

25. A composite membrane in accordance with claim 23, wherein substantially all pores of said porous substrate have pore sizes one of less than and equal to about 1000 nm in diameter.

26. A composite membrane in accordance with claim 25, wherein said pore sizes are one of less than and equal to about 200 nm in diameter.

27. A composite membrane in accordance with claim 26, wherein said pore sizes are one of less than and equal to about 20 nm in diameter.

28. A composite membrane in accordance with claim 25, wherein at least one of said metal carbonate and said metal oxide comprises nanosized particles sized to fit within said pores of said porous substrate.

* * * * *